United States Patent [19]

Harman

[11] Patent Number: 5,719,920

[45] Date of Patent: Feb. 17, 1998

[54] METHOD AND APPARATUS FOR PROCESSING AND DOWNLOADING SOUND MESSAGES ONTO A PERMANENT MEMORY OF A COMMUNICATION PACKAGE

[75] Inventor: Jeffrey A. Harman, Kenosha, Wis.

[73] Assignee: The Messenger Group LLC, Milwaukee, Wis.

[21] Appl. No.: 564,501

[22] Filed: Nov. 29, 1995

Related U.S. Application Data

[63] Continuation-in-part of Ser. No. 414,801, Mar. 31, 1995, abandoned.

[51] Int. Cl.[6] .................................................. H04M 1/64
[52] U.S. Cl. ........................... 379/88; 379/67; 395/611; 395/612; 395/762; 395/806
[58] Field of Search ........................... 379/67, 88, 89, 379/201, 71, 355, 91, 202, 100; 395/611, 612, 613, 762, 806

[56] References Cited

U.S. PATENT DOCUMENTS

| | | | |
|---|---|---|---|
| 3,881,313 | 5/1975 | Kaulins | 58/105 |
| 4,677,657 | 6/1987 | Nagata et al. | 379/63 |
| 4,916,726 | 4/1990 | Morley, Jr. et al. | 379/88 |
| 5,008,926 | 4/1991 | Misholi | 379/89 |
| 5,045,327 | 9/1991 | Tarlow et al. | 381/51 |
| 5,063,698 | 11/1991 | Johnson et al. | 40/124.1 |
| 5,113,429 | 5/1992 | Morley, Jr. et al. | 379/88 |
| 5,184,971 | 2/1993 | Williams | 446/142 |
| 5,228,075 | 7/1993 | La et al. | 379/67 |
| 5,241,586 | 8/1993 | Wilson et al. | 379/88 |
| 5,251,251 | 10/1993 | Barber et al. | 379/67 |
| 5,283,818 | 2/1994 | Klausner et al. | 379/67 |
| 5,333,266 | 7/1994 | Boaz et al. | 395/200 |
| 5,367,609 | 11/1994 | Hopper et al. | 395/2.87 |
| 5,384,829 | 1/1995 | Heileman, Jr. et al. | 379/67 |
| 5,390,236 | 2/1995 | Klausner et al. | 379/67 |
| 5,425,078 | 6/1995 | Stern | 379/67 |
| 5,425,082 | 6/1995 | Sugino | 379/100 |
| 5,426,518 | 6/1995 | Ohyanagi | 358/296 |
| 5,444,767 | 8/1995 | Goetcheus et al. | 379/67 |
| 5,459,581 | 10/1995 | Ohyanagi | 358/296 |
| 5,461,665 | 10/1995 | Shur et al. | 379/67 |
| 5,471,470 | 11/1995 | Sharma et al. | 370/271 |
| 5,479,411 | 12/1995 | Klein | 379/88 |
| 5,483,580 | 1/1996 | Brandman et al. | 379/88 |
| 5,490,206 | 2/1996 | Stern | 379/67 |
| 5,535,256 | 7/1996 | Maloney et al. | 379/34 |
| 5,550,649 | 8/1996 | Wong et al. | 379/100 |
| 5,557,659 | 9/1996 | Hyde-Thomson | 379/88 |
| 5,559,875 | 9/1996 | Bieselin et al. | 379/202 |
| 5,570,414 | 10/1996 | Stern | 379/67 |
| 5,617,423 | 4/1997 | Li et al. | 370/426 |

*Primary Examiner*—Krista Zele
*Assistant Examiner*—Scott Wolinsky
*Attorney, Agent, or Firm*—Michael Best & Friedrich

[57] ABSTRACT

A communication package has, enclosed in a storage disc, a voice chip connected by power input bus terminals to a renewable, battery power system which provides easy battery accessibility. The storage disc preferably contains an acoustically resonant chamber and diffusion apparatus and preferably contains a removable barrier between the power system and the power input bus terminals that must be removed before the voice chip can be energized. A unitized interface system (UIS) is used to store a voice message in the communication package by recording the voice message, replaying the voice message, optionally re-recording at least a portion of the voice message until the replay is satisfactory and converting the voice message to a compressed, digital "sound file". Identifying information is encoded and converted into a compressed, digital "text file" and combined with the "sound file". The identifying information is separated from the combined files and is displayed or printed. Only the contents of the "sound file" are downloaded onto the voice chip of the communication package.

43 Claims, 6 Drawing Sheets

METHOD AND APPARATUS FOR PROCESSING AND DOWNLOADING SOUND MESSAGES ONTO A PERMANENT MEMORY OF A COMMUNICATION PACKAGE

CROSS-REFERENCE TO RELATED APPLICATIONS

This application is a continuation-in-part of application Ser. No. 08/414,801 filed Mar. 31, 1995, which is now abandoned.

BACKGROUND OF THE INVENTION

1. Field of the Invention

This invention relates to communication packages. In one of its aspects it relates to storage discs for voice or other sound messages. In another of its aspects it relates to high quality reproduction of voice or other sound messages for long term storage. In yet another aspect it relates to protecting the recordability of a one-time recordable voice chip. In another aspect it relates to means for both preventing the energizing of a voice chip and conserving the battery power source stored in a disc, communication package. In further aspects of the invention it relates to methods for storing a voice or other sound message on a communication package of this invention.

In other aspects of the invention it relates to a unitized interface system (UIS) system for recording and downloading a sound message onto a communication package and a method utilizing this UIS for recording a sound message from a communication network onto a communication package. In a further aspect the invention relates to digitally compressing telephonically received messages for economical storage on a voice chip in a communication package and subsequent expansion of the compressed data from the chip in the communication package to produce a sound message.

2. Description of the Prior Art

The voice is among the most personal reminders of a loved one. Any message, even if written with the greatest care, can be enhanced for the one receiving the message if it is delivered in the voice of the sender. We have, therefore, had great development of the use of telephone communication to provide fast service and high quality transmission for interchange between those seeking more intimate verbal interaction.

There are times, however, when both parties are not available for such interaction. There are also times when there is a desire to be able to preserve the expression of feelings of a special occasion. Up to the present, such desires have been served by sending such mementos as greeting cards and flowers with appropriate, appended, personal notes or, in more recent times, by sending sound motion pictures or video tapes with audio messages. The present invention provides a more personal addition to greeting cards or flowers and a less costly alternative to movies and videos by providing a way to commemorate an occasion with a voice or other sound message that can be added to a greeting card, flowers or other expression of an occasion to provide not only a more personal reminder of the feelings of the occasion but also a memento that can be played again and again. The communication package of this invention is designed so that a storage disc can be lovingly stored for years or carelessly tossed in a drawer to be discovered years later and still provide the thrill of a remembrance of things past, recorded in a voice as it was at the time commemorated.

The method and apparatus for storing a message on the communication package of this invention is designed to facilitate processing of the communication packages as a commercial venture allowing customers to record a communication package to be sent alone, as part of a greeting card or as an accompaniment of a presentation of flowers, a fruit basket or other gift souvenir. Using apparatus that is a UIS located in the individual store that will deliver the presentation, a customer can telephone a national service organization, such as a floral association, or a regional organization, such as a department store chain serving several stores in a given area, and be connected directly with an individual store to record a message or a customer can record a voice message for the communication package in person or by telephone message dealing directly with an individual store equipped with the UIS. The message is digitally compressed and thereby economically stored on a sound chip in a communication package equipped with ability at the pressing of a button to expand the compressed, stored message into a high quality sound reproduction of the recorded message. The voice recording can be used to further personalize a gift or a really special occasion can be memorialized with a keepsake.

3. Description of the Prior Art

U.S. Pat. No. 5,228,075 discloses a typical system for storing a telephone message on a voice chip, but does not disclose a selective downloading onto a permanent, storable disc.

U.S. Pat. No. 5,184,971 discloses a toy telephone that is an audio recorder that uses voice recordable microchips to retain messages that can either be vocalized directly into the toy telephone mouthpiece or through a conventional telephone receiver used in concert with the toy telephone recorder. The apparatus and method of this patent make no provision for a permanent, storable, commemorative disc and therefore do not disclose a storage disc with an acoustically resonant cavity nor do they provide means for conserving a battery powering means for the storage apparatus.

U.S. Pat. No. 5,045,327 discloses a digital recording center suitable for installation in a shop and use by a customer in that shop to directly record, replay and re-record, as necessary, a voice message that is then downloaded into a playback module having a speaker and a playback control button. The playback module is suitable for insertion into a compartment in a greeting card, picture, ornament, toy or the like.

U.S. Pat. No. 5,063,698 discloses a greeting card with voice synthesizing circuitry capable of playing back a digitally encoded voice message from a pre-recorded voice chip. The system for recording and installing a voice chip in a card requires recording the message on an answering machine at a central location where the message is encoded onto an electronic chip which is then transferred to a delivery point where it is incorporated into a greeting card. There is handling of an electronic chip by a number of people at multiple locations.

U.S. Pat. No. 5,425,078 proposes a system, described as overcoming deficiencies of U.S. Pat. No. 5,063,698, in which a "voice message keepsake" is produced which contains an erasable voice chip, power source and playback switch. The voice chip is recorded while in place in the "keepsake" package in a local business place by telephonically downloading a message recorded on a central recording system at a call-in order point remote from the downloading site. This system gives the central, call-in order point control of the process.

None of the systems discussed above provide either means or method for compressing a digital message for storage on a voice chip in a communication package with means in the communication package for expanding the compressed data to provide a voice message. None of the systems discussed above provide either means or method for incorporating both sound and identifying text into a single file of data with transmission of this file of data between locations.

4. Objects of the Invention

It is, therefore, an object of the present invention to provide, as a communication package, a storage disc containing a voice chip operably connected by power input bus terminals to a renewable power system located in the storage disc.

It is another object of the invention to position a renewable power system in a storage disc to provide easy battery accessibility.

It is another object of the invention to provide a storage disc with an acoustical resonance.

It is still another object of the invention to provide a removable barrier in a storage disc to isolate the battery power system so that the barrier must be removed to energize the voice chip.

It is still another object of the invention to provide a method and apparatus using digital conversion of analogous signals to a binary digital data stream with compression of the data stream for transmission and downloading to a voice chip thereby allowing an optimization of the physical aspects of the communication package, obtaining optimal signal to noise ratio and minimum distortion in transmitting a voice message.

It is still another object of the invention to provide a method and apparatus for digital storage and reproduction of a voice message in a communication package incorporating a storage disc (1) containing a voice chip and (2) having means for receiving compressed data onto the chip and thereafter expanding the compressed, data operably connected by power input bus terminals to a renewable power system located in the storage disc. The communication package preferably, contains at least one of (1) an acoustical resonance means, (2) an acoustical diffusion means, (3) a removable barrier in the storage disc to isolate the battery power system so that the barrier must be removed to energize the voice chip and (4) a one-time programmable voice chip.

It is a preferred object of this invention to provide a UIS and method for its use at a given location for recording and downloading to a communication package a message recorded at that location through a telecommunication system, providing control of the recording and downloading functions at the location at which the communication package is produced, thereby allowing the UIS to provide service directly to a broad array of clientele without being dependent on any other entity for recording services.

It is another preferred object of this invention to provide a "sound file" of a recorded, digital, compressed message along with digital, compressed identification "text file" data.

It is another preferred object of this invention to provide means and method for holding or transferring single files of data containing both sound and text data and for separating the text data for display.

It is another preferred object of this invention to provide, as a communication package, a storage disc that has removable means adapting it for attachment to a presentation package, particularly in a floral package, but which affords easy removal of the attachment means to facilitate the storage of the disc.

These and other aspects, objects and the various advantages of this invention will become apparent upon reading this specification and studying the appended drawing and claims.

BRIEF DESCRIPTION OF THE DRAWING

Like items are assigned like numbers in the various figures.

DESCRIPTION OF THE PRESENT INVENTION

According to this invention a communication package is provided in which a voice chip is operably enclosed in a storage disc and operably connected by power input bus terminals to a renewable, battery power system which is positioned in the storage disc to facilitate battery accessibility.

Also according to this invention a method is provided for storing a voice message in a communication package as set out above by (a) recording a voice message into a recording unit to provide a recorded, voice message; (b) playing the recorded, voice message; (c) optionally, re-recording at least a portion of the voice message to provide an improved, recorded, voice message and playing the improved, recorded, voice message; (d) repeating step (c) as required to provide an accepted, recorded, voice message and (e) downloading the accepted, recorded, voice message from the recording unit onto the voice chip of the communication package described above.

According to this invention unitized apparatus and method of its use are provided for (a) alternatively, (1) receiving a message by telephone which is recorded, as set out above, into the unitized apparatus and storing the message in the unitized apparatus and (2) receiving by telecommunication data transfer a message which has been recorded, as set out above, and storing the message in the unitized apparatus and (b) downloading the stored, recorded message onto a communication package as described above.

Also according to this invention specific apparatus and method of use are provided for a unitized interface system (UIS) for receiving, recording and downloading a sound message onto a communication package and receiving data identifying the sound message and storing these data as a text message; a ganged programming socket unit (GPSU)

attachable as an adjunct to the UIS; a unitized communication package; a unitized application specific integrated circuit (ASIC) for use in the unitized communication package and a transfer data network (TDN) for communicating with and among the unitized specific interface systems.

DESCRIPTION OF THE PREFERRED EMBODIMENTS

Figures 1A, 1B:
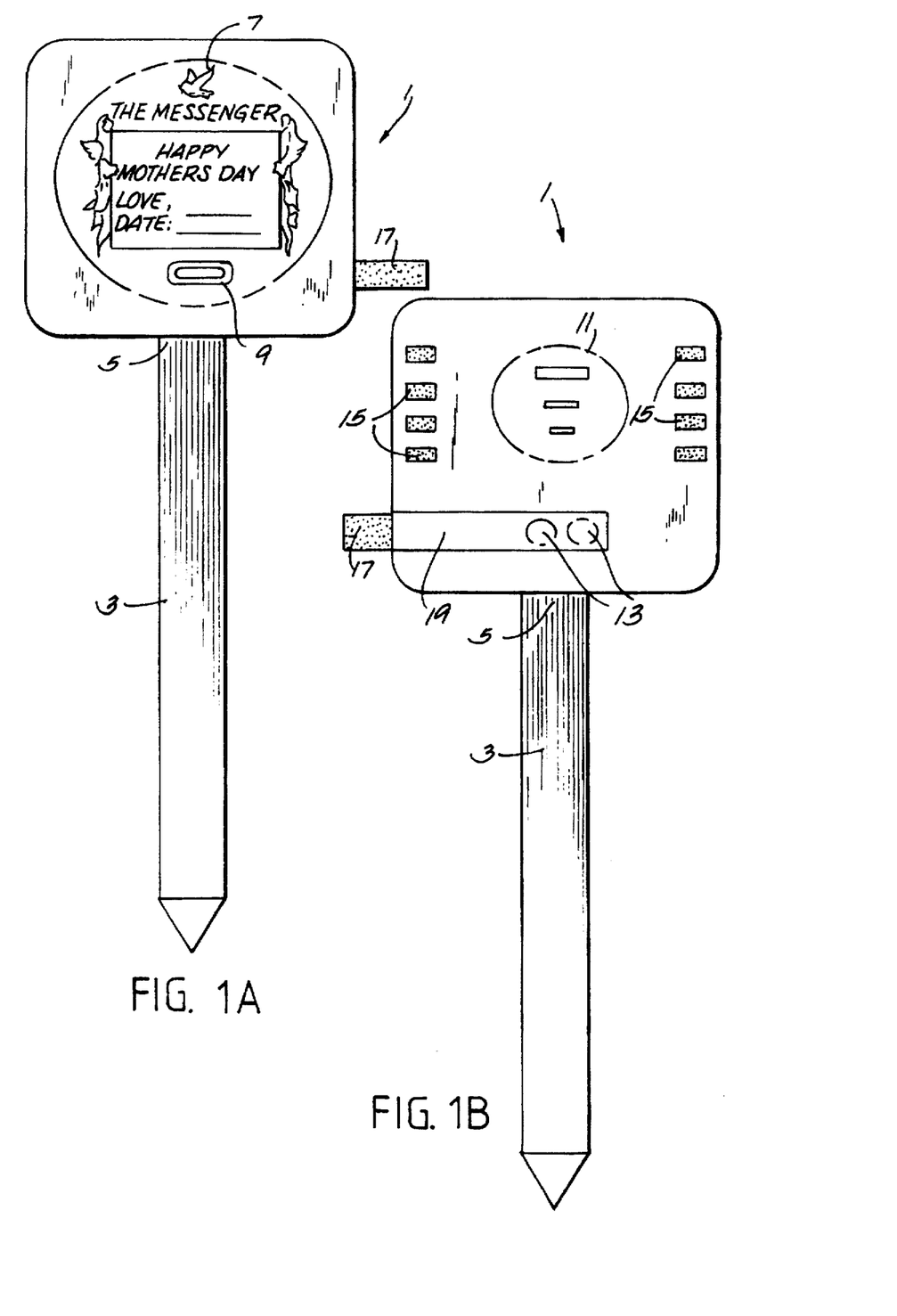
FIG. 1A is a front view of a communication package of the present invention useful in a floral presentation.
FIG. 1B is a back view of a communication package of the present invention useful in a floral presentation.

Referring to FIG. 1A and FIG. 1B, a front view and a back view, respectively, of a preferred communication package of this invention, the communication package 1 is attached to a detachable stem 3 so that it can be secured into a floral arrangement. Although an elongated stem, either integrally molded or as an attached wooden or plastic stem, is illustrated here as the means for attaching the communication package to an item presented, any other type of attachment device suitable for attachment to any type of merchandisable item can be used. Such attachment devices as a ring; an overlapping, spring action circlet, dual sided adhesive tab or a loopable, double cord, among others, can be used. The stem can be weakened by pinching or perforation at its juncture 5 with the communication package to facilitate removal for disposal. Preferred for presentations in which a card or attaching envelope is appropriate is a communication package having the appearance shown in FIGS. 1A and 1B but with the stem attachment portion removed to provide a simple disc.

On the front of the package is an imprinted logo, colorful painted surface adornment or stick-on decal 7, appropriate to the occasion, which indicates the location of switch 9 for playing the recording. From the side of the package extends a pull tab 17 which is the end of an insulating tape 19 that extends through the interior of the package past the side of the battery at the interior of the package thereby separating the battery from the rest of the electrical system of the package until the tab is pulled to remove the insulating tape 19.

On the back of the package are the speaker outlet 11, which, preferably, has tuned resonance ports and diffusion apparatus for enhanced speech frequency response transmission; the battery cell 13 which are partially embedded in fitted receptacles to facilitate access and metal plated electrical contacts 15 used for connection into the recording unit. The pull tab 17 for the insulating tape 19 extends through the interior of the package separating the battery from the rest of the electrical system until the tab is pulled.

Figure 2A:
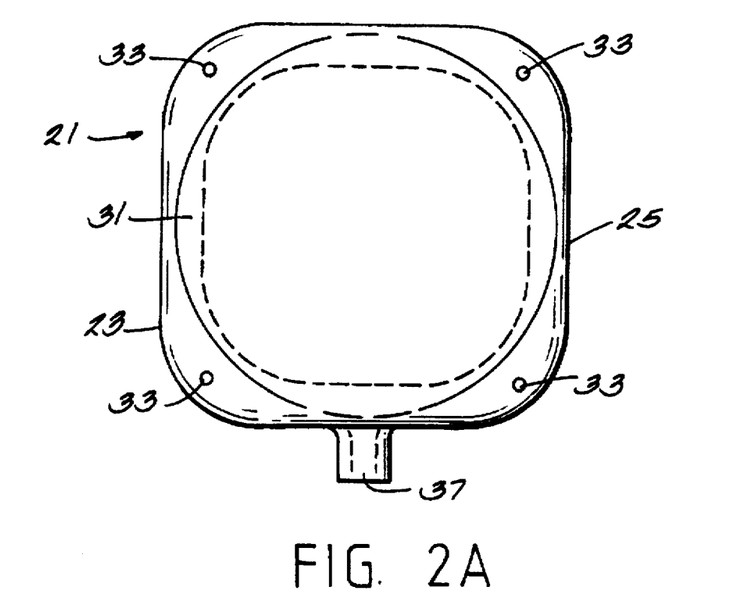
FIG. 2A is a front view of a case for the communication package of this invention.
Figure 2B:
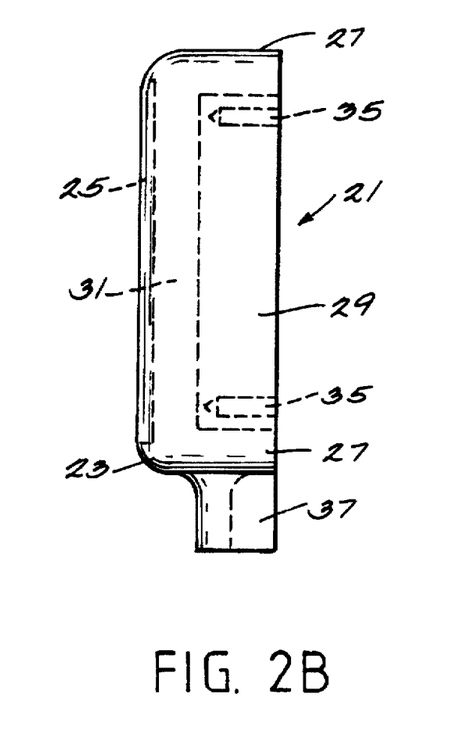
FIG. 2B is a side view of a case for the communication package of this invention.

Referring to FIG. 2A and FIG. 2B, the case 21 for the communication package is composed of two molded, disc pieces 23 that are planar surfaces 25 having raised edges 27 on one side to form a cavity 29. The disc pieces are identical with the exception that one of the disc pieces, preferably, has a circular recess 31 on the outer face for receiving a stick-on, identification label and that one of the disc pieces, preferably, has enlarged head pins 33 molded on its mating surface while the other piece has receiving holes 35 for the pins in its mating surface thereby allowing the disc pieces to be snapped together. Both disc pieces can have receiving holes in the mating surfaces with pins supplied separately for securing the disc pieces together.

In a preferred embodiment of the invention, the disc piece that serves as the back side of the communication package has nickel plated electrical contacts 15 molded into it and openings are molded and/or cut into it for retention of the speaker outlet 11 and battery cell 13 (as seen in FIG. 1B). For embodiments of the invention in which the communication package is molded to represent a three dimensional object other than a discoid the contacts can be incorporated into a socket to connect with a plug from the recorded message downloading means and the speaker outlet and battery cell similarly adapted for incorporation into the surface of the object.

The disc pieces secured together and fitted with a speaker outlet 11 provide an encased chamber 29 that not only is used to retain the circuit assembly, voice chip and playback switch but also acts as a resonator for enhancing the quality of the sound produced. To the end of providing the best quality sound reproduction the disc pieces are molded from a tough, rigid thermoplastic. The currently preferred material of construction is ABS resin, which is a graft copolymer of elastomeric polybutadiene base grafted with styrene and acrylonitrile monomers.

The size and shape of the communication package can vary as long as it is consonant with the intended use of the package. The disc pieces can be square, rectangular, oval, circular, cordate or other simple discoid shapes or the communication package can be molded into a spheroid, an animal representation or some other three dimensional representation. Currently the invention preferentially is represented by a molded case for the communication package that has a resonant cavity that has a square face 1.6 inches on the side with rounded corners and is 0.45 inch in depth with molded sidewalls of 0.2 inch and face walls of 0.1 inch to provide the desired resonance. With other shapes or sizes of resonant cavity, adjustment of the wall thickness would be required to assure the desired resonance.

It has been previously noted that a means for attachment 3 can be made part of the communication package. The attachment means can be integrally molded (FIGS. 1A and 1B) or a female receptacle 37 can be formed by molded portions of the disc pieces as the disc pieces are secured together (FIGS. 2A and 2B). The molded portions forming the receptacle can also be made as snap-off pieces or the disc pieces can be molded without attachment receptacles to facilitate storage of the communication package. The use of a molded receptacle permits its use with a variety of plug-in attachment means thereby allowing only one type of package to be stocked. The disc pieces can also be molded with no attachments or attachment means (as in FIG. 1A without the attached stem) and be delivered in an envelope or clipped directly to the item delivered.

Figure 3:
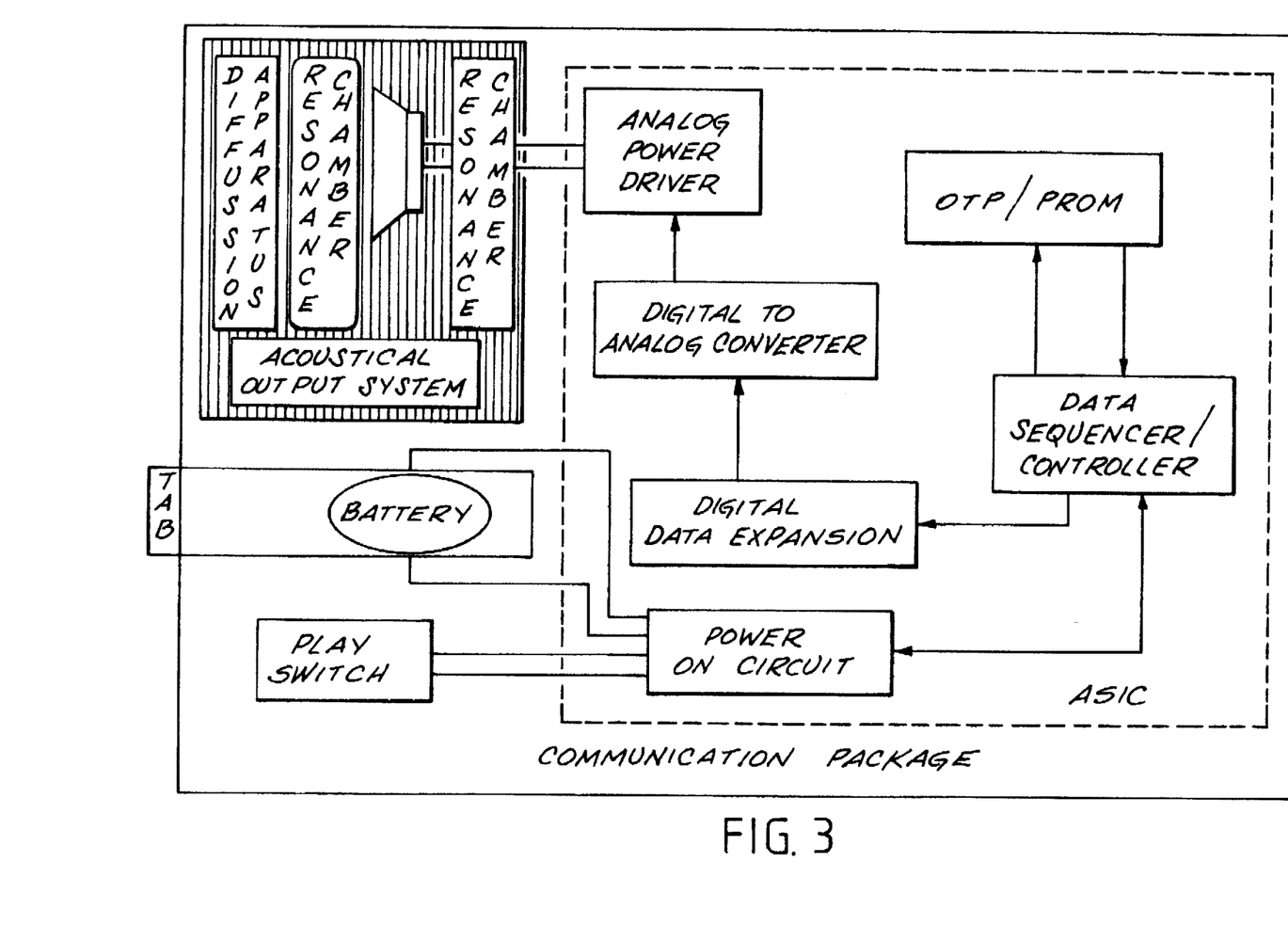
FIG. 3 is a block schematic of the communication package circuitry specifically showing an application specific integrated circuit (ASIC).

Referring to FIG. 3, the communication core of the communication package can be constructed around an application specific integrated circuit (ASIC) central processing unit. The processing unit permits digital data to be processed in, assigning the information into the non-volatile memory storage which is later retrieved and reproduced as an analogous signal in the speaker transducer in at least one acoustically resonant cavity. The recording of the digital input data is preferably to a one-time programmable chip. Connection with the battery power source is required to activate the processing unit either to record or to play back the recorded message. Removal of the insulating tape (FIGS. 1A and 1B) energizes the system. Closing the actuation switch provides playback.

Referring to FIG. 3, the unitized communication package of this invention has a housing containing therein: (A) a unitized, application specific integrated circuit (ASIC) having an OTP/PROM operably connectable to (1) means for powering the programming of the OTP/PROM and (2) means operably connected to a memory means for transmitting a stored, compressed digital message from the memory means to the OTP/PROM; (B) a battery power source operably connected to the ASIC; (C) a play button circuit operably connected to the ASIC and (D) an acoustical output device operably connected to the ASIC.

Still referring to FIG. 3, the unitized application specific integrated circuit (ASIC) for a communication package has as operating components: (A) a one time programmable/ programmable read only memory (OTP/PROM) operably connected to (B) means for sequencing and controlling flow of data input and output of the ASIC providing transmittal of data to and from the OTP/PROM and operably connected to provide data to (C) means for expanding data received which is operably connected to transmit expanded data to (D) means for converting digital data to analog wave forms operably connected to (E) means, operably connectable to an acoustical output system, for magnifying the analog wave forms to match the electrical requirements of an operably connected acoustical output system and (F) power on circuitry with function timing means for controlling operating power to all internal functions of the ASIC with the power on circuitry (1) operably connected to power components (A)–(E) and (2) operably connectable to a power source and an actuation switch or play button circuit.

The recording and downloading of a sound message onto a communication package entails transmitting compressed data from the memory means of the UIS to the OTP/PROM through means for sequencing and controlling flow of data input located in a unitized application specific integrated circuit (ASIC) in a communication package.

Playing a sound message from a communication package entails activating a play button circuit thereby originating a sequenced and controlled flow of compressed digital data from the OTP/PROM; expanding the compressed digital data from the OTP/PROM; converting the expanded digital data to analog signals and using these analog signals to drive an acoustical output system thereby producing sound waves.

The non-volatile memory storage of the ASIC, the preferred processing unit, has in accelerated laboratory ageing tests proved to have a life of over 100 years, possibly almost infinitely. An important part of this invention has, therefore, been to facilitate the changing of the battery power source by locating the battery on the outside of the closed communication package.

For the commercial operation of this invention it is important that the operation of the system for recording a voice message be made as convenient as possible. Provision has, therefore, been made to permit recording of the communication package both in person and by telephone from outside the shop. The in-person recording is accomplished by using an in-house telephone link to the unitized recording and storage system located in the same shop but the telephone link is set up to cause the recording session to be handled as a call from outside the premises.

In a business, such as a florist shop, providing the service of this invention there will be a unitized data input processing and holding center, a unitized interface system (UIS), which programs the sound message onto the communication package unit. The UIS accepts an input call and provides cued responses to guide a caller through the steps of recording, playback and re-recording, as necessary, to obtain a finalized message which is stored within the UIS until downloaded at the shopkeeper's convenience onto the communication package.

When a consumer goes into a shop or by telephone requests that a voice message be recorded, the message is compressed as it is recorded into the digital data input system. The message is then played back to the person who made the recording who is then given the opportunity to re-record part or all of the message. The process of record, listen and re-record is repeated until a message satisfactory to the customer is obtained. The approved message is then ready to be digitally recorded onto the voice chip in the communication package.

The process involved in the compression and recording in the unitized recording system is the reverse of the process involved in the playback from the communication package. The apparatus for the unitized recording and storage system carries out the functions at the direction of the programming of its central processing computer with these same processes being reversed in the hardware of an application specific integrated circuit (ASIC) of the communication package. The complete, integrated action can be economically successful only because the compression of the data received into the unitized recording and storage system allows an ASIC to be provided for the communication package that is sufficiently compact to permit production of a communication package that can deliver the required sound reproduction quality and still be commercially cost effective.

The data input processing and holding center of this invention can be as simple as a packaged unit of high quality recording equipment kept in an individual shop which forms the basis of the most preferred embodiment of this invention or as sophisticated as banks of high quality recording equipment operated as an 800 number call-in service of a national business organization. In general, the individual equipment and technology for such operations are well known.

Figure 4:
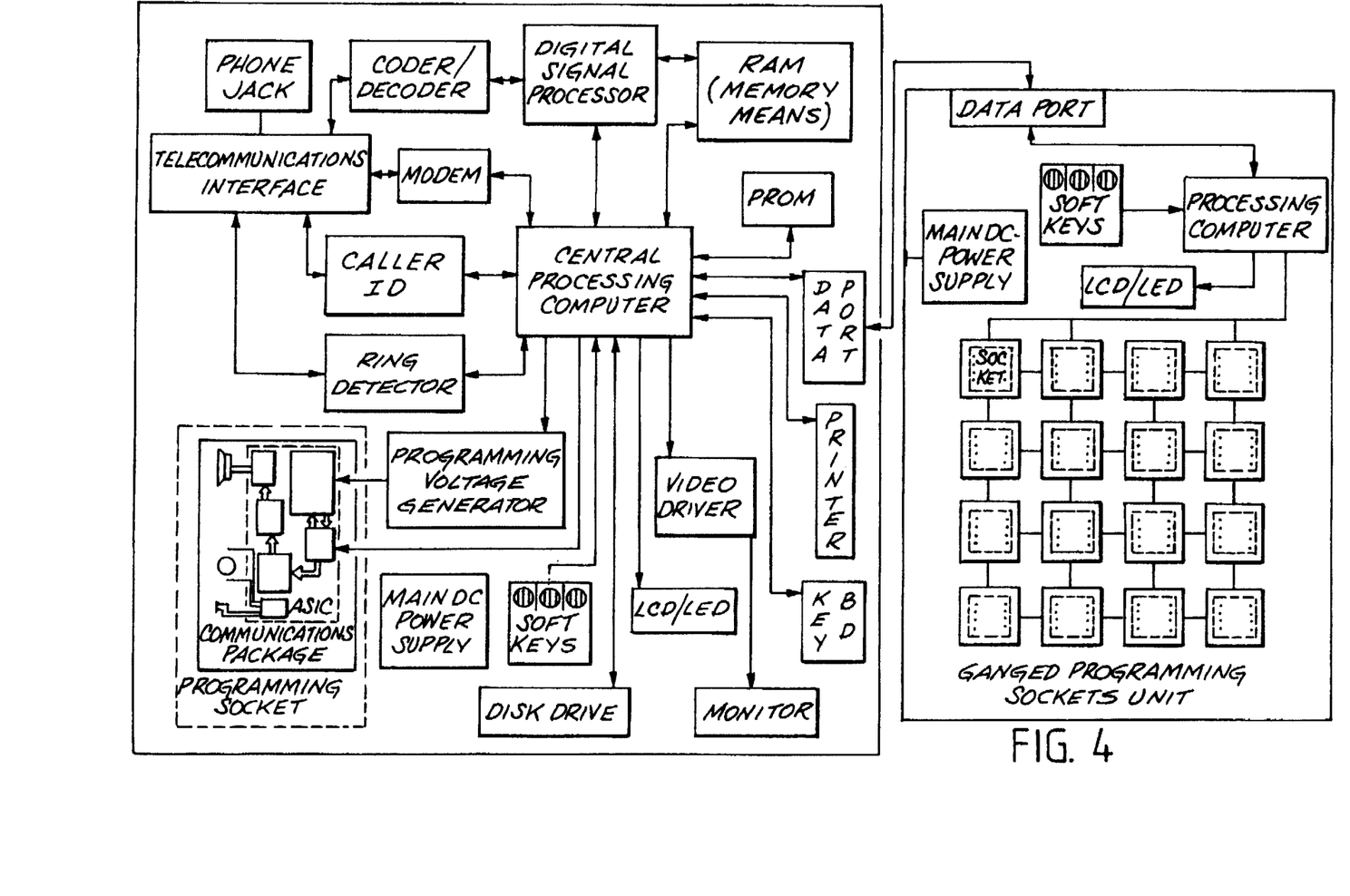
FIG. 4 is a schematic of a unitized interface system with a ganged programming sockets unit operably attached.

A basic unitized recording and storage system, or UIS, suitable for installation in an individual shop is shown in FIG. 4. This system sets out the various functions essential to the operation of this invention along with apparatus included in the packaged system suitable for accomplishing these functions.

A UIS useful in this invention for receiving and recording a telephonically transmitted sound message has as operating components: (A) a telephone interface means for receiving a telephonic message, (B) means for converting the telephonic message to digital signals, (C) means for compressing the digital signals to provide compressed, digital signals, (D) means for recording the compressed, digital signals to provide recorded, compressed, digital signals and (E) means for downloading the recorded, compressed, digital signals onto a programmable read only memory of a communication package. Preferably the UIS also has the capability through the programming of the computer incorporated therein to encode and, preferably, also compress digital, identification information with the recorded, compressed digital signals of the sound message to provide a sound file of the recorded message along with a text file of encoded, digital, identification information such as order information, which also can be compressed and means for storing the encoded and preferably compressed, digital information and recovering a directory, i.e. the totality of the encoded, digital, identification information at a UIS to which the information is transferred, preferably with additional means for providing a visible directory, i.e. a printout or other visible expression of the information.

The UIS has as specific components (A) a data processing system (DPS) which includes a telephone jack for operably connecting both analog and digital telecommunication systems to telecommunication interface means for receiving an analogous sound message which provide hi-directional analog and digital signal transmission. The telecommunication interface means is operably connected to coder/decoder means (CODEC) which provide bi-directional conversion of incoming analog signals to outgoing digital signals and conversion of incoming digital signals to outgoing analog signals. The CODEC transmits the converted signal to a digital signal processor means (DSP) for improving speech and sound fidelity while compressing digital signals from the CODEC and expanding digital signals into the CODEC. The DSP is operably connected in (B) a data processing and storage system (DPSS) to both at least one memory means, preferably random access memory means (RAM) which records and stores compressed digital signals of a sound message from the DSP, and central processing computer means (CPC). The number of memory means needed in a UIS depends on the memory requirements of the DPSS units put into the UIS. The CPC is connected to the memory means and a programmable read only memory means (PROM) which is part of the DPSS. The essential functions of the CPC are detecting signals from the DSP, directing the memory means and the PROM to respond to the DSP signals and directing memory means and PROM response to the DSP signals and memory means response to function control key command signals from the CPC. The CPC is necessarily also operably connected to (C) a message downloading system (MDS) containing both the communication package with its one time programmable/programmable read only memory (OTP/PROM) and the programming voltage generator (PVG) for powering the programming of the OTP/PROM. The PVG is contained in the MDS. An input power source is operably connected to power all of the components of the UIS.

Figure 5:
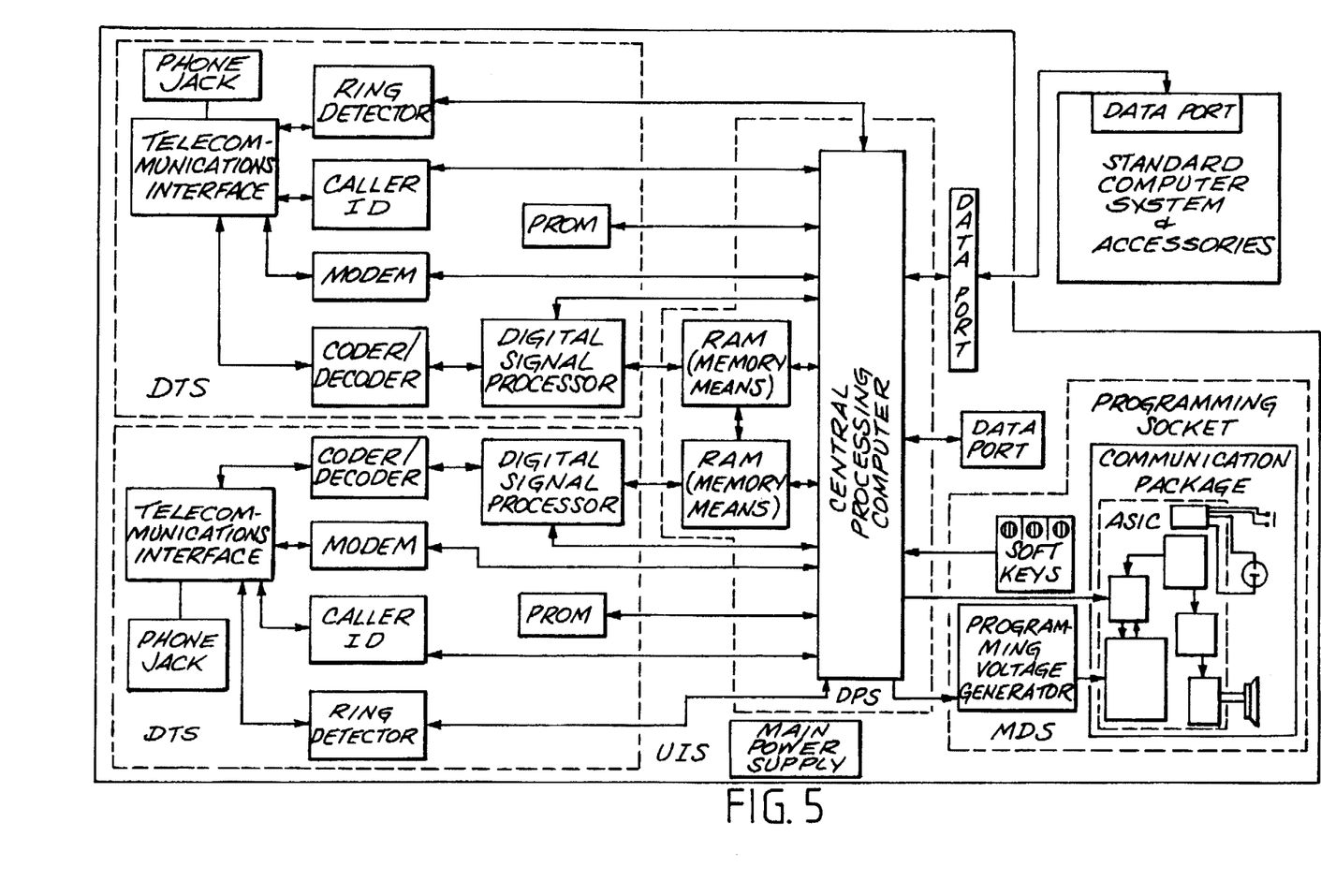
FIG. 5 is a schematic of a unitized interface system with multiple data processing and storage systems and a standard computer operably attached to provide at least a portion of the functions of the central processing computer means.

A UIS, as shown in FIG. 4, is arranged to receive one input sound message at a time. The message is received into the DPSS, processed and stored ready to be downloaded before another incoming call can be processed. As shown in FIG. 5, to allow multiple calls to be handled simultaneously the number of DPSS units in the UIS unit must be multiplied by the number of calls for which simultaneous service is desired or the complete UIS unit as shown in FIG. 4 must be multiplied by the number of calls for which simultaneous service is desired. The CPC can be designed to accommodate multiple DPSS units and the downloading process is done at the pleasure of the shopkeeper so that the UIS unit is best described as requiring at least one DPSS per CPC and MDS.

The UIS preferably has as further components in the CPC means for encoding and compressing digital, identification information from the standard storage and transmission media used in the computer industry to be used with the recorded, compressed digital signals to provide both a sound file and an accompanying, text file of digital signals with encoded and preferably compressed, digital, identification information in a single, file package and in the MPS means for recovering a directory of the encoded and preferably compressed, digital, identification information. Preferably the directory can include a visible display in a form such as, among others, an LCD display, an LED display, a cathode ray tube (CRT) display or a printout display of identification information or means for providing a printout of order information, such as an accessory printer operably attached to a data port of the UIS.

Among other components that can be included in the DPSS are (1) a mixed signal transmitter/receiver, more specifically a MODEM, operably linking the telecommunication interface means with the CPC to provide bi-directional digital signal transmissions therebetween; (2) automatic caller identification circuitry operably linking the telecommunication interface means with the CPC to allow an incoming call to be identified and logged by the CPC and (3) telephonic ring detection circuitry operably linking the telecommunication interface means with the CPC to permit programmable answering of incoming calls. The CPC can have as further components, among others, a display means of computerized aids for downloading stored messages from the memory means to the OTP/PROM and soft key buttons (SKB) controlling the operations required for the downloading. The MDS can have as further components, among others, a programming socket (PS) for programming a communication package, the PS located at a surface of the UIS and operably connected to the CPC and PVG to provide an operable linking to the PS for downloading a sound message to a communication package operably connected into the PS and at least one data port for operably connecting accessory equipment to the UIS to access both (a) data therein and (b) internal operation of the UIS required to obtain the data.

The UIS can have any number of accessories attached through data ports. One of the most useful to the purpose of this invention is a ganged programming sockets unit (GPSU), as shown in FIG. 4, operably connected to a data port of the UIS. A ganged programming sockets unit (GPSU) has as operating components: (1) a GPSU data port and connecting circuitry for operably connecting the GPSU with a data port of the UIS for recording and downloading a sound message onto a communication package; (2) a GPSU processing computer (GPSUPC) operably connected to the GPSU data port and a multiplicity of programming sockets with which the GPSUPC sorts instructions from the CPC of the UIS to transfer information from the memory means of the UIS to an individual programming socket of the GPSU. For operation, the unitized GPSU has an input power source operably connected to power the components of the GPSU.

Referring to FIG. 5, the use of a data port to operably connect the UIS to a standard computer permits at least a portion of the functions of the CPC of the UIS to be carried out by programming the standard computer to accommodate these functions. This provides a versatility and added economy for individual merchants who are already equipped with computer systems. It also allows adjunct equipment such as a monitor, a printer, a keyboard, a CDROM, a facsimile machine, or the like to be connected either to the standard computer or operably attached to the UIS at a data port and allows the many features of a standard computer to be easily available to the UIS without duplicating these features in the UIS itself.

Again referring to FIG. 4 or 5, the operation of the UIS for receiving and recording a telephonically transmitted sound message according to this invention broadly entails the steps of (A) converting a telephone message to digital signals, (B) compressing the digital signals, (C) recording the compressed digital signals and (D) downloading the compressed digital signals onto a programmable read only memory of a communication package. Digital identification information can be encoded with the recorded, compressed digital signals to provide a sound file of the recorded, digital signals and a text file with encoded digital identification information.

More specifically, an analog telecommunication message is received through a telephone jack and telecommunication interface means. A coder/decoder means (CODEC) converts incoming analog signals to outgoing digital signals. A digital signal processor means (DSP) improves speech and sound fidelity while compressing digital signals from the CODEC to provide compressed digital signals. The compressed digital signals of a sound message from the DSP are recorded and stored in a random access memory means (RAM). A central processing computer means (CPC) then directs the memory means to respond to functional key command signals to download the stored, compressed digital signals of the sound message onto a one time programmable/ programmable read only memory (OTP/PROM) of a communication package while simultaneously directing the programming voltage generator (PVG) to respond to functional key command signals from the central processing computer means (CPC) to power the programming of the OTP/PROM.

During the recording of the message into the UIS by a customer/caller the CPC responds to digital signals from the DSP with recorded instructions from a programmable read only memory means (PROM) for recording and re-recording a message in preparation for recording and storing compressed digital signals of a sound message from the DSP in the memory means.

Among other functions that can be included in the UIS are (1) providing bi-directional mixed signal (analog/digital) transmissions between the telecommunication interface means and the CPC using a mixed signal transmitter/ receiver, more specifically a MODEM, operably linking the telecommunication interface means with the CPC; (2) providing identification and logging of incoming calls by the CPC using either automatic caller identification circuitry linking the telecommunication interface means with the CPC or using identification of sound or text information with manual logging through a computer keyboard or keypads to the CPC; (3) providing programmed answering of incoming calls using telephonic ring detection circuitry operably linking the telecommunication interface means with the CPC; (4) providing for separation of the sound file from the text file for downloading the sound message and (5) controlling the downloading of stored messages from the memory means to the OTP/PROM using a display means of computerized aids and soft key buttons (SKB) of the CPC; (6) downloading a sound message to a communication package operably connected to a programming socket (PS), the PS located at a surface of the UIS and operably connected to the CPC and PVG, (7) de-compressing the text information for display or printout, (8) purging obsolete sound messages and/or text data and (9) accessing both internal operation of the UIS and data therein and accessory equipment operably connected to the UIS through at least one data port.

In utilizing the external features available as accessory to the UIS a data port can be used to download a sound message to a communication package operably connected to a programming socket of a ganged programming sockets unit (GPSU). In the ganged programming sockets unit (GPSU) a GPSU processing computer (GPSUPC), operably connected to the GPSU data port and a multiplicity of programming sockets, sorts instructions from the CPC of the UIS to transfer information from the memory means of the UIS to an individual programming socket of the GPSU.

Figure 6:
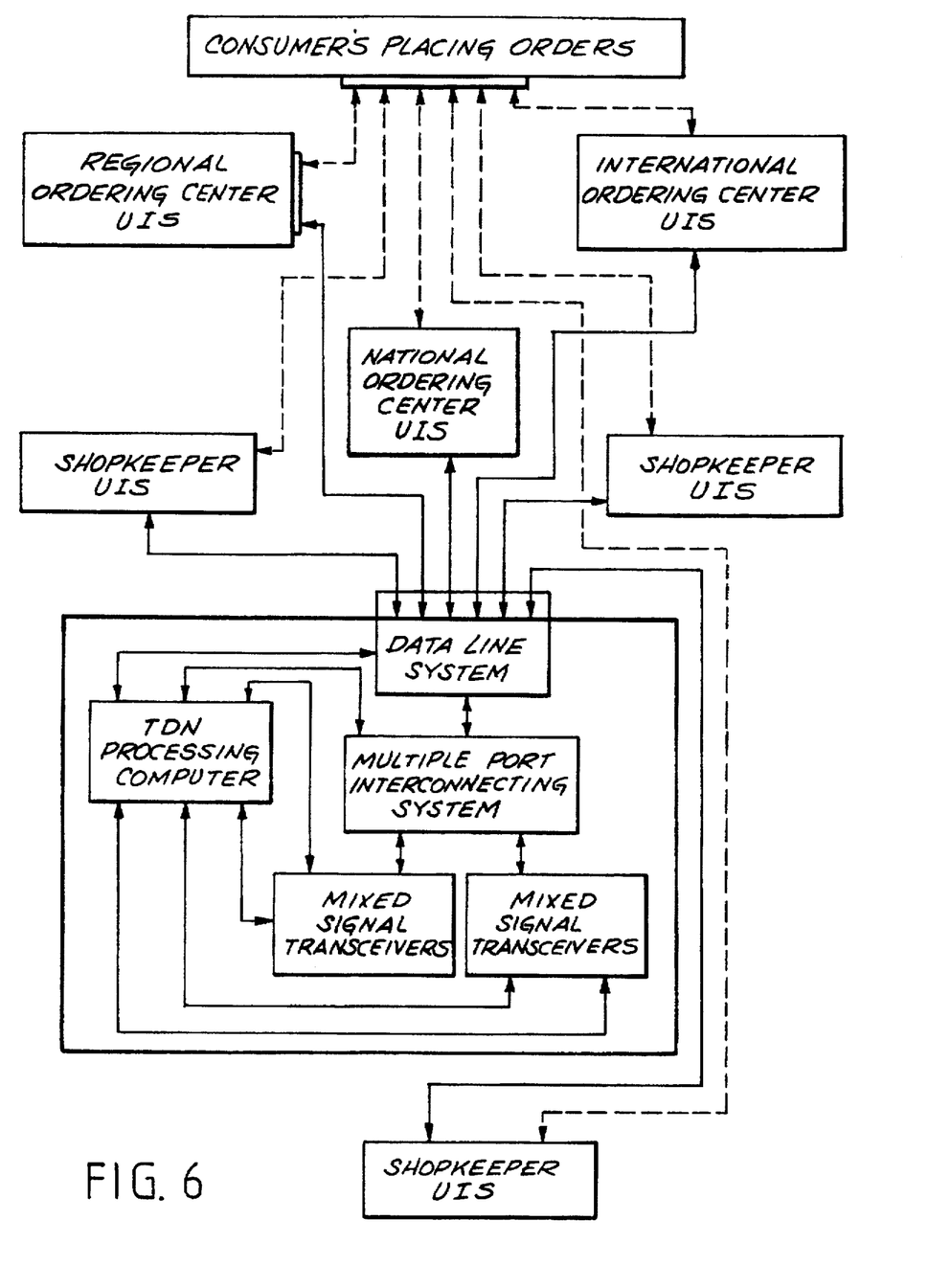
FIG. 6 is a schematic of a transfer data network.

Communication from one UIS to another UIS and between centralized ordering facilities and an individual UIS is facilitated by including in the apparatus available for this invention a transfer data network (TDN) as a link, preferably an automated link, for order and message transmission. FIG. 6 shows consumer two-way messages as dotted lines going directly to a shopkeeper UIS or an ordering center. The ordering center then sends the message to a TDN which sends the message to a shopkeeper UIS (shown as heavy solid line).

The TDN requires as operating components: (A) a mixed signal transmitter/receiver for simultaneous transfer line operation, (B) an analog/digital dataline system, i.e. any datalink system, such as, more specifically, a 1-800 multi-line analog/digital telephone system, (C) a multiple port interconnecting system operably connecting at least one mixed signal transmitter/receiver, more specifically a MODEM, with the dataline system, and (D) a TDN processing computer (TDNPC) means (1) operably connected to (A)–(C), as shown by fine lines in FIG. 6, and (2) programmed to coordinate transfer of data between and through (A)–(C). The TDNPC can also be (3) programmed to store data and retrieve data; (4) programmed to provide a central facility for CPC reprogramming and (5) programmed to process data for transfer to a CPC for reproduction.

When a consumer desires the service it can be available, through the individual shopkeeper directly, through the shopkeeper, passed on by the shopkeeper to another shopkeeper, through a regional or national business organization or through a regional or national business organization directly. In any event the recording of the finalized message onto the communication package will be in an individual shop having a unitized device programming unit which can directly download the compressed, digital, recorded message onto the voice chip of the communication package.

If dealing with a shopkeeper who has access to a national business organization or dealing directly with the national business organization the recording and playback sequence may be required by the national organization to be carried out at a central facility controlled by the national organization with the recorded message being thereafter transferred by telecommunication into the holding portion of the unitized device at the shopkeeper's location. The UIS transfers the finalized sound message and identifying text in binary, digital code directly from a telephone line into a means for data compression and then into the storage system of the UIS for later transfer to the digital device programming unit for downloading of the sound message onto the voice chip of the communication package or transfer of the text data to a printer or visual readout device.

A regional or national organization can link an ordering call into the shopkeeper's UIS for the compression of the data for the recording, re-recording and storage until downloading onto the communication package or can record the message at a central facility with temporary storage of the recorded message at the central facility before transmission directly or through a TDN to the individual shop for compression, storage and downloading onto a communication package.

Individual shops can have the option of recording on their own premises, linking into a central facility or linking directly into another individual shop for recording. The linking into another facility can be done using a TDN.

In any event the message is identified with encoded and preferably compressed, digital, identification information that along with the sound message becomes an integral part of a sound file. The combination of the sound file with a text file is the package transferred between locations through the communication lines. At the downloading facility a stored message is identified through a visual representation of the identification information in a form such as, among others, an LCD display, an LED display, a cathode ray tube (CRT) display or a printout and matched with an appropriate message decal for the face of the communication package. The data in the text file contains the information necessary for customer records and billing. The text file data is retained in the UIS from which the sound message is downloaded onto the communication package and can be retained in any UIS through which it passes.

The usefulness of this invention is fully realized in the versatility afforded the shopkeeper by the UIS which allows all of the compression, recording, re-recording and storage of sound messages and identifying text to be done in the unit or, when required, permits the introduction, compression and storage of a sound message with identifying text recorded outside of the unit until the sound message can be separated from the text and downloaded onto a communication package. This versatility permits an individual shopkeeper not only to deal individually with local and long distance customers but also permits the shopkeeper to provide the local order filling and delivery service required by a variety of regional, national and international merchandizing organizations having their own ordering systems.

The invention thus being described, it will be obvious that the same may be varied in many ways. Such variations are not to be regarded as a departure from the spirit and scope of the invention and all such modifications are intended to be included within the scope of the following claims.

What is claimed is:

1. A unitized interface system (UIS) for processing and downloading sound messages onto a permanent memory of a communication package, the UIS comprising:

a telecommunication interface means for receiving a sound message;

means for converting the sound message into digital signals when received in other than digital form;

means for compressing the digital signals to provide compressed, digital signals;

means for recording the compressed, digital signals to provide recorded, compressed, digital signals, as a sound file;

means for combining a text file of encoded, digital, identification information with the sound file into a single file; and means for downloading only the recorded, compressed, digital signals of the sound file onto the permanent memory of the communication package.

2. A UIS according to claim 1, the UIS further comprising means for compressing the encoded, digital, identification information.

3. A UIS according to claim 2 wherein the permanent memory is a programmable read only memory, the UIS further comprising means for recovering the identification information.

4. A UIS according to claim 1, the UIS comprising as operating components:

(A) at least one data transmission system (DTS) comprising:

(1) a telephone jack for receiving analog and digital signals operably connecting analog and digital telecommunication systems to a telecommunication interface means;

(2) telecommunication interface means providing bi-directional analog and digital signal transmission for receiving analog and digital signals, the telecommunication interface means operably connected to transmit the analog signals to a coder/decoder means (CODEC) and the digital signals to a digital signal processor means (DSP);

(3) coder/decoder means (CODEC) for bi-directionally converting incoming analog signals to outgoing digital signals and converting incoming digital signals to outgoing analog signals operably connected to transmit digital signals to a digital signal processor means (DSP);

(4) digital signal processor means (DSP) for compressing and encoding digital signals from the CODEC and expanding digital signals into the CODEC with the DSP operably connected to transmit compressed and encoded digital signals into a data processing and storage system (DPSS);

(B) a data processing and storage system (DPSS) operably connected to both (1) at least one memory means for recording and storing compressed and encoded digital signals of a sound message and an associated text file from the DSP and (2) central processing computer means (CPC) operably connected to the memory means with the CPC functions comprising:

(a) detecting signals from the DSP, (b) directing the memory means to respond to signals from the DSP, (c) directing the memory means response to function control key command signals from the CPC and (d) providing means for directing the encoding of digital, identification information to produce a text file of encoded, digital, identification information; and (C) an input power source operably connected to power all components of the UIS.

5. A UIS according to claim 4, the CPC further comprising means for directing the compressing of encoded, digital, identification information with the recorded, compressed, digital signals to provide a sound file comprising the recorded, compressed, digital signals with a text file of encoded, digital, identification information.

6. A UIS according to claim 5, the CPC further operably connected to a message downloading system (MDS) comprising (1) a communication package comprising a one time programmable/programmable read only memory (OTP/PROM) and means for sequencing and controlling flow of data input to the OTP/PROM and (2) a programming voltage generator (PVG) for powering the programming of the OTP/PROM.

7. A UIS according to claim 6, the DPSS further comprising means for recovering the digital, identification information.

8. A UIS according to claim 6 wherein the CPC further comprises a directory of computerized aids for downloading stored messages from the memory means to the OTP/PROM and soft key buttons (SKB) controlling the operations required for the downloading.

9. A UIS according to claim 6 wherein the MDS further comprises a programming socket (PS) for programming a communication package, the PS located at a surface of the UIS and operably connected to the CPC and PVG to provide an operable linking to the PS for downloading a sound message from the memory means of the UIS to a communication package operably connected into the PS.

10. A UIS according to claim 9 wherein the MDS further comprises a communication package operably connected into the PS.

11. A UIS according to claim 6 wherein the MDS further comprises at least one data port for operably connecting accessory equipment to the UIS to access both data therein and internal operation of the UIS required to obtain the data.

12. A UIS according to claim 11 wherein a least a portion of the is located outside the UIS and is operably connected to the UIS through a data port.

13. A UIS according to claim 11, the UIS further comprising a ganged programming sockets unit (GPSU) operably connected to the data port.

14. A ganged programming sockets unit (GPSU) comprising as operating components:
 (A) a GPSU data port and connecting circuitry for operably connecting the GPSU with a data port of a UIS of claim 11 for downloading a sound message from the memory means of the UIS onto a communication package operably connected into an individual programming socket of the GPSU;
 (B) a GPSU processing computer (GPSUPC) operably connected to the GPSU data port and a multiplicity of programming sockets whereby the GPSUPC can sort instructions from the CPC of the UIS to transfer information from the memory means of the UIS to an individual programming socket of the GPSU; and
 (C) an input power source operably connected to power the components of the GPSU.

15. A UIS according to claim 4, 5 or 6 wherein the DTS further comprises at least one mixed signal transmitter/receiver operably linking the telecommunication interface means with the CPC thereby providing bi-directional signal transmissions therebetween.

16. A UIS according to claim 4, 5 or 6 wherein the DTS further comprises automatic caller identification circuitry operably linking the telecommunication interface means with the CPC thereby allowing an incoming call to be identified and logged by the CPC.

17. A UIS according to claim 4, 5 or 6 wherein the DTS further comprises telephonic ring detection circuitry operably linking the telecommunication interface means with the CPC thereby allowing programmable answering of incoming calls.

18. A UIS according to claim 4, 5 or 6 operably connected to a transfer data network (TDN), the TDN comprising:
 (a) a dataline system,
 (b) mixed signal transmitter/receivers for simultaneous transfer line operation,
 (c) a multiple port interconnecting system operably connecting the mixed signal transmitter/receivers with the dataline system, and
 (d) a TDN processing computer (TDNPC) means (1) operably connected to elements (a)-(c) and (2) programmed to coordinate transfer of data between and through elements (a)-(c).

19. A UIS according to claim 18 wherein the TDNPC is (3) programmed to store data; (4) programmed to provide a central facility for CPC reprogramming and (5) programmed to process data for transfer to a CPC for reproduction.

20. A method for processing and downloading sound messages onto a permanent memory of a communication package, the method comprising:
 receiving a sound message;
 converting the sound message into digital signals when received in other than digital form;
 compressing the digital signals to provide compressed, digital signals;
 recording the compressed, digital signals to provide recorded, compressed, digital signals, as a sound file;
 combining a text file of encoded, digital, identification information with the sound file into a single file; and
 downloading only the recorded, compressed, digital signals of the sound file onto the permanent memory of the communication package.

21. A method of claim 20 further comprising compressing the encoded, digital, identification information.

22. A method of claim 21, wherein the permanent memory is a programmable read only memory the method further comprising recovering the compressed, encoded, identification information.

23. A method of claim 20 further comprising:
 (A) receiving an analog telephone message through a telephone jack and telecommunication interface means;
 (B) converting incoming analog signals to outgoing digital signals in a coder/decoder means (CODEC);
 (C) improving speech and sound fidelity while compressing digital signals from the CODEC in a digital signal processor means (DSP) to provide compressed digital signals; and
 (D) recording and storing compressed digital signals of a sound message from the DSP in a memory means.

24. A method of claim 23 further comprising compressing the encoded, digital identification information.

25. A method of claim 23 further comprising directing a programming voltage generator (PVG) to respond to functional key command signals from a central processing computer means (CPC) to power the programming of a one time programmable/programmable read only memory (OTP/PROM).

26. A method of claim 25 further comprising recovering the encoded, identification information.

27. A method of claim 26 wherein recovering the identification information includes displaying the recovered, identification information.

28. A method of claim 26 wherein recovering the encoded, identification information includes printing of order information using an accessory printer operably attached to a data port.

29. A method of claim 23, 24 or 25, step (D) further comprising:
 (1) recording a voice message into the memory means to provide a recorded, voice message;
 (2) playing the recorded, voice message;
 (3) optionally, re-recording at least a portion of the voice message to provide an improved, recorded, voice message and playing the improved, recorded, voice message; and
 (4) repeating step (3) as required to provide an accepted, recorded, voice message.

30. A method of claim 23, 24 or 25 further comprising responding to digital signals from the DSP with recorded instructions from a programmable read only memory means (PROM) for recording and re-recording a message in preparation for step (D).

31. A method according to claim 25 further comprising providing bi-directional signal transmissions between the telecommunication interface means and the CPC using a mixed signal transmitter/receiver operably linking the telecommunication interface means with the CPC.

32. A method according to claim 25 further comprising providing identification and logging of incoming calls by the CPC using automatic caller identification circuitry linking the telecommunication interface means with the CPC.

33. A method according to claim 25 further comprising manual logging of identification information to the CPC after identification of sound or text information.

34. A method according to claim 25 further comprising providing programmed answering of incoming calls using telephonic ring detection circuitry operably linking the telecommunication interface means with the CPC.

35. A method according to claim 25 further comprising controlling the downloading of stored messages from the memory means to the OTP/PROM using a visible directory of computerized aids and soft key buttons (SKB) of the CPC.

36. A method according to claim 25 further comprising downloading a sound message to a communication package operably connected to a programming socket (PS), the PS operably connected to the CPC and PVG.

37. A method according to claim 25 further comprising accessing data through at least one data port.

38. A method according to claim 37 wherein a least a portion of the functions of the is carried out by a second CPC through the data port.

39. A method for recording and downloading a sound message onto a communication package having a data port according to claim 37 further comprising downloading a sound message to a communication package operably connected to a programming socket of a ganged programming sockets unit (GPSU) operably connected thereto.

40. A method for recording and downloading a sound message onto a communication package having a data port according claim 37 wherein in the ganged programming sockets unit (GPSU) a GPSU processing computer (GPSUPC), operably connected to the GPSU data port and a multiplicity of programming sockets, sorts instructions from the CPC to transfer information from the memory means to an individual programming socket of the GPSU.

41. A method according to claim 25 further comprising transmitting compressed data from the memory means to the OTP/PROM through means for sequencing and controlling flow of data input located in a unitized application specific integrated circuit (ASIC) in a communication package.

42. A method according to claim 25 wherein the method further comprises transferring data to, holding data in and transferring data from a transfer data network (TDN), the method further comprising:

(E) transferring data to a dataline system from a unitized interface system (UIS) and from a multiple port interconnecting system;

(F) transferring data to the multiple port interconnecting system from a dataline system and from a mixed signal transmitter/receiver;

(G) transferring data to the mixed signal transmitter/receiver from a multiple port interconnecting system and from a TDN processing computer (TDNPC);

(H) transferring data to the TDNPC from a mixed signal transmitter/receiver and storing data in the TDNPC while coordinating steps (E)–(H) through control by the TDNPC.

43. A method according to claim 42 wherein transferring data to, holding data in and transferring data from a TDN further comprises at least one function chosen from the group consisting of (1) storing data in the TDNPC; (2) reprogramming a processing computer located in a UIS; (3) processing data for transfer to the CPC of a UIS for storage and (4) processing data for transfer to the CPC of a UIS for printout.

* * * * *